United States Patent
Morvan et al.

(10) Patent No.: US 9,080,095 B2
(45) Date of Patent: Jul. 14, 2015

(54) VISCOELASTIC COMPOSITION WITH IMPROVED STABILITY

(75) Inventors: Mikel Morvan, Pessac (FR); Guillaume Degre, Talence (FR)

(73) Assignee: RHODIA OPERATIONS, Aubervilliers (FR)

( * ) Notice: Subject to any disclaimer, the term of this patent is extended or adjusted under 35 U.S.C. 154(b) by 935 days.

(21) Appl. No.: 12/989,013

(22) PCT Filed: Apr. 17, 2009

(86) PCT No.: PCT/EP2009/054618
§ 371 (c)(1),
(2), (4) Date: Dec. 20, 2010

(87) PCT Pub. No.: WO2009/130170
PCT Pub. Date: Oct. 29, 2009

(65) Prior Publication Data
US 2012/0085534 A1    Apr. 12, 2012

(30) Foreign Application Priority Data
Apr. 22, 2008 (FR) ..................... 08 02237

(51) Int. Cl.
*C09K 8/80* (2006.01)
*E21B 43/267* (2006.01)
*C09K 8/584* (2006.01)

(52) U.S. Cl.
CPC ..................... *C09K 8/584* (2013.01)

(58) Field of Classification Search
None
See application file for complete search history.

(56) References Cited

U.S. PATENT DOCUMENTS

| | | | | |
|---|---|---|---|---|
| 5,551,516 A | * | 9/1996 | Norman et al. | 166/308.2 |
| 5,964,295 A | * | 10/1999 | Brown et al. | 166/308.2 |
| 5,979,555 A | * | 11/1999 | Gadberry et al. | 166/270.1 |
| 6,831,108 B2 | | 12/2004 | Dahanayake et al. | |
| 7,299,870 B2 | * | 11/2007 | Garcia-Lopez De Victoria et al. | 166/279 |
| 7,380,602 B2 | * | 6/2008 | Brady et al. | 166/282 |
| 7,556,098 B2 | | 7/2009 | Berger et al. | |
| 2002/0002205 A1 | | 1/2002 | Dahanayake et al. | |
| 2004/0063587 A1 | * | 4/2004 | Horton et al. | 507/100 |
| 2006/0081370 A1 | * | 4/2006 | Fu et al. | 166/279 |
| 2006/0102349 A1 | * | 5/2006 | Brady et al. | 166/282 |
| 2006/0131017 A1 | * | 6/2006 | Garcia-Lopez De Victoria et al. | 166/282 |
| 2006/0157248 A1 | * | 7/2006 | Hoefer et al. | 166/300 |
| 2007/0107897 A1 | | 5/2007 | Dahanayake et al. | |
| 2007/0142235 A1 | | 6/2007 | Berger et al. | |
| 2008/0257551 A1 | * | 10/2008 | Morris | 166/270 |
| 2009/0065207 A1 | * | 3/2009 | Shenoy et al. | 166/278 |

FOREIGN PATENT DOCUMENTS

WO    WO 9856497    12/1998

* cited by examiner

*Primary Examiner* — John J Figueroa
(74) *Attorney, Agent, or Firm* — Xuping Fu

(57) ABSTRACT

The present invention relates to a method for the enhanced recovery of oil from an underground formation, in which a viscoelastic aqueous fluid comprising at least one viscosifying zwitterionic surfactant is injected into the said formation and the said fluid is conducted through this formation in order to displace the oil from the formation and to recover it via a different point from that where the viscoelastic aqueous fluid was introduced, characterized in that the said fluid exhibits an amount of a base sufficient to bring its pH to a value of greater than 10, preferably of between approximately 11 and 13.

19 Claims, No Drawings

VISCOELASTIC COMPOSITION WITH IMPROVED STABILITY

CROSS-REFERENCE TO RELATED APPLICATION

This application is the U.S. National Phase of International Application Number PCT/EP2009/054618 filed on Apr. 17, 2009, which claims priority to French Application No. FR 08/02237 filed Apr. 22, 2008, both of which are incorporated by reference herein in their entireties.

FIELD OF THE INVENTION

The invention relates to a viscoelastic composition having improved stability.

The present invention relates to the use of viscoelastic fluids in the technique for the enhanced recovery of crude oil present in underground formations. These fluids are obtained by addition/dissolution of a viscosifying zwitterionic surfactant which confers viscoelastic properties on the said fluids. The invention also relates to formulations which can be used for enhanced oil recovery methods.

BACKGROUND

In the context of the production of crude oil from underground formations, different methods exist for optimizing the extraction of original oil in place (OOIP).

The method for the primary production of crude oil consists, once the well has been drilled, in recovering the crude oil by migration of the oil from the rock or sand formation towards a well of lower pressure and in then pumping it to the surface via a "producing" well. Primary production is for this reason the least expensive method of extraction. Typically, only from 10 to 15% of OOIP is recovered. Nevertheless, as the oil is pumped, the pressure decreases and the extraction becomes more difficult.

Secondary production methods are then employed when the underground pressure becomes insufficient to displace the remaining oil. The commonest technique, water flooding, uses injection wells which force a drive fluid, composed of large volumes of water under pressure, into the zone comprising the oil. During its migration from the zone to one or more producing well(s), the injected water carries along a portion of the oil which it encounters. At the surface, the oil is separated from the injected water. Water flooding makes it possible to recover an additional 10 to 30% of OOIP.

When water flooding reaches the point where production is no longer profitable, a decision has to be taken: change of oil field or recourse to another operating phase. Use may then be made of an enhanced recovery technique using water flooding in which the water comprises surface-active agents and/or polymers. These polymers are used to increase the viscosity of the drive fluid and to thus improve the flushing of the oil by the drive fluid. For example, it is known to increase the viscosity of the water using viscosifying agents, such as partially hydrolyzed polyacrylamides of high molecular weight. However, these acrylic polymers exhibit an inadequate stability when the drive fluid exhibits a certain amount of divalent ions, as is the case in seawater, for example, and/or at operating temperatures of greater than 80/100° C.

These water-dispersible and/or water-soluble surfactants, on contact with the oil present in the rock or the sand, lower the water/oil interfacial tension to make possible the entrainment of the oil trapped in the constrictions of the pores of the reservoir.

It is thus known to inject a drive fluid which makes it possible both to reduce the water/oil interfacial tension below 1 mN/m and to maintain, under the temperature and salinity conditions of the reservoir, a viscosity of 10 cPs at a shearing of $10\ s^{-1}$ for a concentration of surfactant of less than 1% by weight, as described in United States of America Patents US 2007/0107897 and US 2007/0142235.

Zwitterionic surfactants and in particular betaines are preferably used due to their stability in brines. The term "zwitterionic" describes surfactants having a permanent positive charge independent of the pH and having a negative charge beyond a certain pH. However, these surfactants can decompose when they are used at temperatures of greater than 80/100° C. in saline oil reservoirs and the drive fluid may then suffer a loss in its viscosifying power.

SUMMARY OF THE INVENTION

There thus still exists a need for viscoelastic compositions which exhibit modified and improved properties, in particular:

good stability at a relatively high ionic strength, in a relatively and even highly saline medium comprising 1, 3, 10 and even up to 20% by weight of salts, generally alkali metal and alkaline earth metal salts, the said medium remaining able to be pumped after having been rendered viscous, good maintenance of the stability and/or of the thickening at relatively high temperature ranging from 50° C., for example, up to 70° C. and even 120° C. and beyond, a temperature of approximately 70° C. being preferred, and an effective viscosifying power at low contents of viscosifying zwitterionic surfactants, and an improved combination and/or compromise of at least two of these properties.

The present invention is also targeted at a method for the enhanced recovery of oil from an underground formation, in which a viscoelastic aqueous fluid comprising at least one viscosifying zwitterionic surfactant is injected into the said formation and the said fluid is conducted through this formation in order to displace the oil from the formation and to recover it via a different point from that where the viscoelastic aqueous fluid was introduced, characterized in that the said fluid exhibits an amount of a base sufficient to bring its pH to a value of greater than 10, preferably of between approximately 11 and 13.

DETAILED DESCRIPTION OF PREFERRED EMBODIMENTS

The invention consists more particularly of a method for the enhanced recovery of oil from an underground formation, comprising at least the following stages:

a) a liquid comprising, as a mixture, at least:
 i) a salified aqueous medium,
 ii) a viscosifying zwitterionic surfactant in solution according to an amount such that the liquid exhibits an oil/water interfacial surface tension of approximately 10 mN/m (millinewtons per metre) or less, measured at ambient temperature (25° C.), and a viscosity of approximately 3 cPs or more, measured at a temperature of 80° C. and for a shear gradient of $10\ s^{-1}$,
 iii) an amount of a base sufficient to bring the pH of the liquid to a value of greater than 10, preferably of between approximately 11 and 13, and
 iv) optionally a surfactant which does not confer a viscoelastic property on the liquid, is injected via at least one injection means in contact with the underground formation comprising the oil and b) the said oil-comprising liquid is recovered via at least one producing means situated at a different point from that where the polymer was introduced.

Entirely surprisingly and unexpectedly, the present invention has made it possible to show that the addition of an alkaline compound to an aqueous solution of a zwitterionic surfactant makes it possible to maintain, during temperature ageing under aerobic conditions, the initial viscosity of the solution. The resulting increase in pH related to the presence of the alkaline compound moreover does not result in a significant decrease in viscosity. Apart from the fact that the temperature stability is maintained, the presence of the compound makes it possible to react with the organic acids of the crude oil and to thus form, within the reservoir, secondary surfactants which will make it possible to further reduce the interfacial tension between the injected liquid and the oil.

The viscosifying zwitterionic surfactant according to the invention preferably corresponds to the general formula:

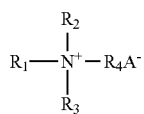

in which:

$A^-$ represents the carboxylate $COO^-$ or sulphonate $SO_3^-$ groups, $R_1$ represents a hydrophobic part of an alkyl, alkoxyalkyl, alkylaminoalkyl and alkylamidoalkyl group in which the identical or different, saturated or unsaturated and linear or branched alkyl groups comprise approximately from 16 to 26 carbon atoms. Examples of long alkyl chains include the tetradecyl (myristyl), hexadecyl (cetyl), octadecenyl (oleyl), octadecyl (stearyl) or docosenyl (erucyl) groups, tallow derivatives and coconut and soybean oils. The preferred $R_1$ groups are the alkylamidopropyl groups from which the alkyl group is chosen from the tetradecyl (myristyl), hexadecyl (cetyl), octadecenyl (oleyl), octadecyl (stearyl) or docosenyl (erucyl) groups. According to a preferred alternative form, the $R_1$ group comprises at least one ethylenic unsaturation.

$R_2$ and $R_3$ independently represent an aliphatic chain, such as, for example, alkyl, alkenyl, arylalkyl, hydroxyalkyl, carboxyalkyl and hydroxyalkyl-polyoxyalkylene, for example hydroxyethyl-polyoxyethylene or hydroxypropyl-polyoxypropylene, groups having from 1 to 30 carbon atoms, preferably from 1 to 20 carbon atoms, more preferably from 1 to 10 carbon atoms and more preferably still from 1 to 6 carbon atoms, it being possible for the said aliphatic group to be linear or branched and saturated or unsaturated. The preferred alkyl chains are methyl or ethyl. The preferred arylalkyl chains are benzyl and the preferred hydroxyalkyl chains are hydroxyethyl or hydroxypropyl chains. The preferred carboxyalkyl groups are carboxymethyl and carboxyethyl. The preferred hydroxyalkyl-polyoxyalkylene groups are hydroxyethyl-polyoxyethylene and hydroxypropyl-polyoxyethylene.

$R_4$ is an alkylene group having from 1 to 4 carbon atoms. The preferred ones are the methylene or ethylene groups.

Specific examples of surfactant zwitterionic viscoelastic surfactants include the following structures:

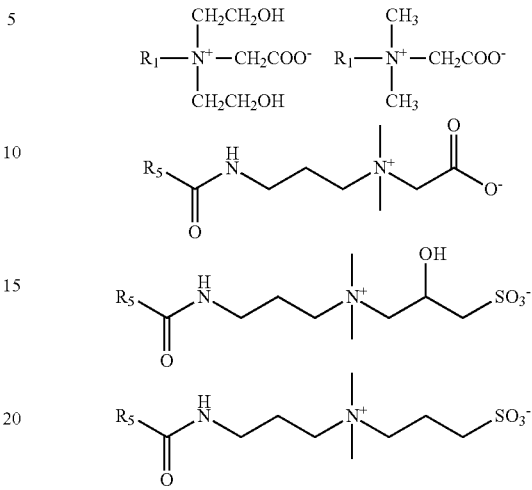

in which $R_1$ is as defined above and the $R_5$—C═O group is a $C_{12}$-$C_{22}$ alkanoyl group chosen in particular from the dodecanoyl, tetradecanoyl (myristoyl), hexadecanoyl (palmitoyl), hexadecenoyl (palmitoleoyl), octadecenoyl (oleoyl), octadecanoyl (stearoyl) or docosenoyl (erucoyl) groups.

Zwitterionic viscoelastic surfactants which can be used in implementing the invention comprise those described in United States of America Patents U.S. Pat. No. 6,831,108 B2 and US 2007/0107897, which are cited as reference in the present description.

The zwitterionic viscoelastic surfactants are present in the aqueous liquid to be injected according to an amount which is effective in viscosifying the said liquid so that, once in the reservoir, the liquid can displace the oil. The viscosifying zwitterionic surfactant according to the invention is in solution in the liquid according to an amount such that the liquid exhibits an oil/water interfacial surface tension of approximately 10 mN/m (millinewtons per metre) or less, measured at ambient temperature (25° C.), and a viscosity of approximately 3 cPs or more, measured at a temperature of 80° C. and for a shear gradient of $10\ s^{-1}$. This amount is generally between 0.05 and 5% by weight, preferably between 0.1 and 2% by weight.

The base is at a content in the saline aqueous fluid to be injected which is sufficient to bring the pH of the liquid to a value of greater than 10, preferably of between approximately 11 and 13.

Use may be made, as suitable base, of any base, preferably any inorganic base, chosen from alkali metal hydroxides, such as sodium hydroxide or potassium hydroxide, or alkaline earth metal hydroxides, such as calcium hydroxide. Use may also be made of ammonium hydroxide or of carbonates and metaborates, such as sodium carbonate, sodium bicarbonate or sodium metaborate. The amount of base varies according to the nature of the various constituents of the liquid mixture to be injected but it generally corresponds to a concentration of the base in the said liquid of between 0.0001 and 5% by weight, preferably between 0.0002 and 1% by weight. The base can be added to the liquid to be injected immediately before use or long before that, during the preparation of the alkaline mixture. According to a preferred embodiment of the invention, it is recommended to use sodium hydroxide and sodium carbonate.

The water can be optionally softened seawater, a brine, fresh water or a waste water comprising various metals and elements, such as sodium, potassium, calcium, zinc, magnesium, and the like.

The liquid can optionally comprise a surfactant which does not confer a viscoelastic property on the liquid.

This surfactant can be added to the liquid in order to modify the viscosifying power and/or in order to lower the surface tension of the liquid and can be chosen from anionic, cationic, non-ionic or zwitterionic/amphoteric surfactants, alone or in combination. When present in the liquid, this nonviscosifying surfactant is present at a content of 0.5% by weight or less, preferably of less than 0.2% by weight and even 0.1% by weight, with respect to the weight of the liquid.

In fact, by virtue of the presence of base in the injected liquid, it is generally pointless to add a surfactant which does not confer viscoelastic properties on the liquid.

The surprising nature of the invention is that the viscoelastic surfactant solution, combined with the alkaline compound alone, makes it possible simultaneously to dispense with the use of oxygen scavengers in order to guarantee the chemical stability for the duration of the drive, fluid under the temperature conditions of its use and to be placed under ideal conditions of viscosity and of lowering of interfacial tension.

The following example illustrates the invention without limiting the scope thereof.

EXAMPLE

Temperature Ageing (80° C.) Under Aerobic Conditions

Use is made of an erucylamidopropyl betaine of formula:

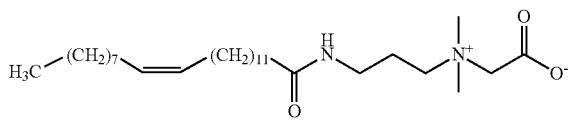

This product is made by repeating the process described in columns 5 and 6 of U.S. Pat. No. 6,831,108. The solutions are prepared by diluting a liquid solution of erucylamidopropyl betaine in an aqueous solvent. Two solutions were tested:
Solutions Tested:
Solution 1:
  erucylamidopropyl betaine (3000 ppm) in a sodium hydroxide solution ([NaOH=$10^{-2}$M]), corresponding to a content of 0.04% by weight and conferring a pH of 12 on the solution.
Solution 2 (Control):
  erucylamidopropyl betaine (3000 ppm) in demineralised water (pH between 6 and 7).
Ageing Conditions:
  The solutions are prepared and placed in two hermetically closed flasks. The latter are then placed in an oven at 80° C. without specific precautions targeted at reducing the level of dissolved oxygen in the solution (no degassing nor addition of oxygen scavengers).
Monitoring of the Ageing:
  The initial viscosity $\eta_0$ of the solutions is measured before placing in the oven. The viscosity of the solution is measured at a temperature of 80° C. with an imposed shear of 10 s$^{-1}$.
  The same measurement is repeated during the ageing in order to monitor the change in the viscosity $\eta(t)$. The relative viscosity $\eta_r$ is then defined as the ratio of the viscosity $\eta(t)$ at the end of a time t to the initial 1a viscosity $\eta_0$.

The results obtained are collated in Table 1 below:

TABLE 1

Change during ageing in the viscosity at 10 s$^{-1}$, measured at 80° C.

| Time (day) | Solution 1 (NaOH) | | Solution 2, control (pure water) | |
|---|---|---|---|---|
| | Viscosity (cP) | Relative viscosity | Viscosity (cP) | Relative viscosity |
| 0 | 19.9 | 1 | 33.8 | 1 |
| 26 | 13.7 | 0.69 | 12.9 | 0.38 |
| 27 | 12.15 | 0.61 | 10.4 | 0.31 |
| 28 | 11.2 | 0.56 | 3 | 0.08 |
| 32 | 9.5 | 0.49 | | |
| 33 | 13 | 0.66 | | |
| 36 | 11.4 | 0.57 | | |
| 47 | 11.2 | 0.56 | | |
| 97 | 8.4 | 0.422 | | |
| 120 | 8.7 | 0.44 | | |

It emerges from Table 1 that the ageing at 80° C. of the solution prepared with pure water as solvent is accompanied by a sudden fall in viscosity at approximately 26 days. This fall in viscosity is due to chemical decomposition of the zwitterionic surfactant molecule.

In contrast, in the case of the solution prepared with dilute sodium hydroxide as solvent, the initial viscosity level is almost completely retained after one year.

The invention claimed is:

1. A method for enhancing the recovery of oil from an underground formation comprising:
  injecting a viscoelastic aqueous fluid comprising at least one viscosifying zwitterionic surfactant into the formation,
    wherein the fluid flows through said formation and displaces the oil from the formation; and,
  recovering said oil at a different location than the location where the viscoelastic aqueous fluid is injected,
    wherein the fluid comprises an amount of a base sufficient for the fluid to have a pH of greater than 10,
    wherein the concentration of the base in said fluid ranges from 0.0001 to 5% by weight.

2. The method of claim 1, wherein the pH ranges from 11 to 13.

3. The method of claim 1, wherein said fluid comprises a liquid comprising:
  a salified aqueous medium,
  a viscosifying zwitterionic surfactant in solution in an amount such that the liquid has an oil/water interfacial surface tension of about 10 mN/m or less, measured at ambient temperature, and a viscosity of about 3 cPs or more, measured at a temperature of 80° C. with a shear gradient of 10 s$^{-1}$, and
  optionally a surfactant that does not confer a viscoelastic property on the liquid.

4. The method of claim 3, further comprising recovering at least a portion of said fluid with said oil.

5. The method of claim 3, wherein said ambient temperature is 25° C.

6. The method of claim 3, wherein the pH ranges from 11 to 13.

7. The method of claim 1, wherein the viscosifying zwitterionic surfactant comprises a surfactant of formula:

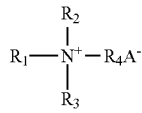

wherein:
A⁻ represents a carboxylate or sulfonate group,
$R_1$ represents a hydrophobic part of an alkyl, alkoxyalkyl, alkylaminoalkyl or alkylamidoalkyl group comprising identical or different, saturated or unsaturated, or linear or branched alkyl groups comprising about 16 to about 26 carbon atoms,
$R_2$ and $R_3$ independently represent an aliphatic chain having from 1 to 30 carbon atoms, wherein said aliphatic group is straight or branched and saturated or unsaturated, and
$R_4$ is an alkylene group having from 1 to 4 carbon atoms.

8. The method of claim 7, wherein $R_2$ and $R_3$ independently represent an aliphatic chain having from 1 to 6 carbon atoms.

9. The method of claim 7, wherein $R_4$ is a methylene or ethylene group.

10. The method of claim 7, wherein the $R_1$ group comprises at least one ethylenic unsaturation.

11. The method of claim 1, wherein the viscosifying zwitterionic surfactant comprises a surfactant of formula:

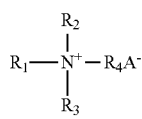

wherein:
A⁻ represents a carboxylate or sulfonate group,
$R_1$ represents a hydrophobic part of an alkyl, alkoxyalkyl, alkylaminoalkyl or alkylamidoalkyl group comprising identical or different, saturated or unsaturated, or linear or branched alkyl groups comprising about 16 to about 26 carbon atoms,
$R_2$ and $R_3$ independently represent an alkyl, alkenyl, arylalkyl, hydroxyalkyl, carboxyalkyl or hydroxyalkylpolyoxyalkylene group, and
$R_4$ is an alkylene group having from 1 to 4 carbon atoms.

12. The method of claim 1, wherein the viscosifying zwitterionic surfactant comprises a surfactant of formula:

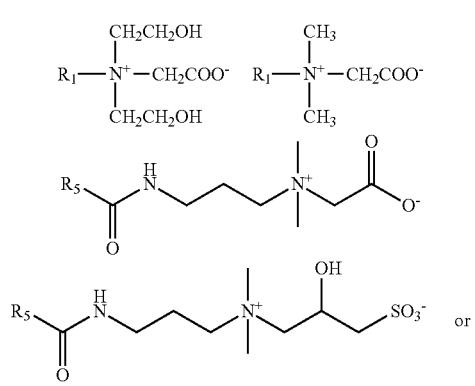

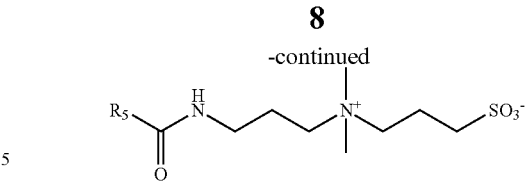

wherein:
$R_1$ represents a hydrophobic part of an alkyl, alkoxyalkyl, alkylaminoalkyl or alkylamidoalkyl group comprising identical or different, saturated or unsaturated, or linear or branched alkyl groups comprising about 16 to about 26 carbon atoms, and
the $R_5$—C=O group comprises a $C_{12}$-$C_{22}$ alkanoyl group comprising a dodecanoyl, tetradecanoyl (myristoyl), hexadecanoyl (palmitoyl), hexadecenoyl (palmitoleoyl), octadecenoyl (oleoyl), octadecanoyl (stearoyl), or docosenoyl (erucoyl) group.

13. The method of claim 1, wherein the base comprises alkali metal hydroxides, carbonates, bicarbonates, metaborates, or a mixture thereof.

14. The method of claim 1, wherein the base comprises sodium hydroxide, potassium hydroxide, sodium carbonate, sodium bicarbonate, sodium metaborate, or a mixture thereof.

15. The method of claim 1, wherein the fluid additionally comprises 0.5% or less by weight of the fluid of a non-viscoelastic surfactant comprising an anionic, cationic, nonionic, zwitterionic, or amphoteric surfactant.

16. The method of claim 1, wherein the amount of viscosifying zwitterionic surfactant ranges from 0.05 to 5% by weight.

17. The method of claim 10, wherein the viscosifying zwitterionic comprises a surfactant of formula:

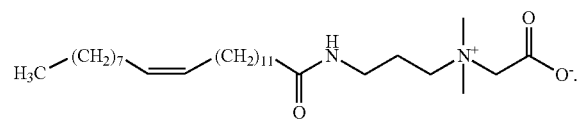

18. The method of claim 1, wherein said fluid comprises a liquid consisting of:
a salified aqueous medium,
a viscosifying zwitterionic surfactant in solution in an amount such that the liquid has an oil/water interfacial surface tension of about 10 mN/m or less, measured at ambient temperature, and a viscosity of about 3 cPs or more, measured at a temperature of 80° C. with a shear gradient of 10 s⁻¹, and
a surfactant that does not confer a viscoelastic property on the liquid.

19. The method of claim 1, wherein said fluid comprises a liquid consisting of:
a salified aqueous medium, and
a viscosifying zwitterionic surfactant in solution in an amount such that the liquid has an oil/water interfacial surface tension of about 10 mN/m or less, measured at ambient temperature, and a viscosity of about 3 cPs or more, measured at a temperature of 80° C. with a shear gradient of 10 s⁻¹.

* * * * *